(12) United States Patent
Tsai et al.

(10) Patent No.: US 6,504,905 B1
(45) Date of Patent: Jan. 7, 2003

(54) SYSTEM AND METHOD OF TESTING VOICE SIGNALS IN A TELECOMMUNICATION SYSTEM

(75) Inventors: Louis K. Tsai, Thornton, CO (US); Ying-li Wu, Superior, CO (US)

(73) Assignee: Qwest Communications International Inc., Denver, CO (US)

( * ) Notice: Subject to any disclaimer, the term of this patent is extended or adjusted under 35 U.S.C. 154(b) by 0 days.

(21) Appl. No.: 09/289,495

(22) Filed: Apr. 9, 1999

(51) Int. Cl.[7] ............................................... H04M 1/24
(52) U.S. Cl. ............................ 379/26.01; 379/27.04; 379/88.08; 379/1.02; 379/10.01; 375/224
(58) Field of Search ......................... 379/26.01, 26.02, 379/27.02, 27.04, 27.08, 41, 67.1, 68, 88.08, 88.09, 88.22, 1.02, 10.01, 10.02, 10.03, 21, 22.02

(56) References Cited

U.S. PATENT DOCUMENTS

| | | | |
|---|---|---|---|
| 5,091,948 A | * | 2/1992 | Kametani ................... 704/248 |
| 5,536,902 A | * | 7/1996 | Serra et al. ................... 84/623 |
| 5,572,570 A | | 11/1996 | Kuenzig |
| 5,633,909 A | | 5/1997 | Fitch |
| 5,710,803 A | | 1/1998 | Kowal et al. |
| 5,797,123 A | | 8/1998 | Chou et al. |
| 5,822,397 A | * | 10/1998 | Newman ................... 379/27.02 |
| 5,825,855 A | * | 10/1998 | Astarabadi ................... 379/67.1 |
| 5,835,565 A | * | 11/1998 | Smith et al. ................. 375/224 |
| 5,850,627 A | | 12/1998 | Gould et al. |
| 5,933,475 A | * | 8/1999 | Coleman ................... 379/1.02 |

* cited by examiner

Primary Examiner—Fan Tsang
Assistant Examiner—Simon P. Sing
(74) Attorney, Agent, or Firm—Brooks & Kushman P.C.

(57) ABSTRACT

A system and method of testing voice signals in a telecommunication system, such as a voice messaging system (VMS), are provided. A test signal is generated to elicit a response from the telecommunication system, and a voice signal produced by the telecommunication system in response to the test signal is detected. To evaluate the detected voice signal, the system accesses stored reference phrases, where one or more designated reference phrases can be combined to form an expected voice signal. The detected voice signal is compared with at least one designated reference phrase to determine if the detected voice signal substantially corresponds to the expected voice signal. In a preferred embodiment, the voice signal and reference phrases are divided into component frames of substantially equal time durations, then compared frame by frame to determine if the detected voice signal and the expected voice signal substantially correspond.

22 Claims, 3 Drawing Sheets

SYSTEM AND METHOD OF TESTING VOICE SIGNALS IN A TELECOMMUNICATION SYSTEM

TECHNICAL FIELD

This invention relates to a system and method for testing a voice interface of a telecommunication system, particularly a voice messaging system (VMS).

BACKGROUND ART

Testing of telecommunication systems involves evaluating the connections and signal quality of the system as well as the performance of services provided by the system. In particular, many telecommunication systems provide a voice messaging system (VMS) which must be tested to ensure that it is functioning properly, especially at the user interface.

In order to test a VMS, a testing system must provide the normal inputs expected by the VMS, as well as monitor and recognize all the possible responses of the VMS. The inputs to a VMS can include both voice signals and non-voice signals, such as dual tone multi-frequency (DTMF) signals, used by a caller to interact with and navigate through the VMS. The responses of the VMS typically include voice prompts to the caller for the entry of voice or non-voice data. It is these voice prompts which define the user interface of the VMS, and which must be tested for quality and accuracy.

Typically, the multitude of voice prompts from the VMS are tested by comparing them with an equivalent number of reference prompts stored by the testing system. In the past, voice recognition has been executed by recognizing and comparing voice prompts word by word, by selected words, or by segmenting words into syllables or phonemes. However, these previous methods require substantial memory in order to store the myriad of different inputs and responses for the VMS, as well as considerable processor capabilities for making the prompt comparisons. Furthermore, such previous methods are time-consuming and inflexible in their manner of prompt recognition.

DISCLOSURE OF INVENTION

Therefore, it is an object of the present invention to provide a system and method of testing voice signals in a telecommunication system that uses phrases of voice prompts to execute voice recognition.

It is a further object of the present invention to provide a system and method of testing voice signals in a telecommunication system that requires less information to be stored to accomplish voice recognition.

It is a still further object of the present invention to provide a system and method of testing voice signals in a telecommunication system that decreases the time required for voice recognition while maintaining accuracy.

Accordingly, a method of testing voice signals in a telecommunication system is provided. The method includes generating a test signal to elicit a response from the telecommunication system and detecting a voice signal produced by the telecommunication system in response to the test signal. The method further includes accessing stored reference phrases, wherein one or more designated reference phrases can be combined to form an expected voice signal. Still further, the method includes comparing the detected voice signal with the designated reference phrases to determine if the detected voice signal substantially corresponds to the expected voice signal.

In a preferred embodiment, the step of comparing the detected voice signals with the designated reference phrases first includes trimming leading silence from the voice signal and determining the average acoustic intensity of the voice signal. Next, the voice signal is divided into component frames of substantially equal time durations. Then, the average acoustic intensity and the number of zero crossings for each voice signal frame is determined, after which the average acoustic intensity of each voice signal frame is normalized by the average acoustic intensity of the entire voice signal. The preferred comparison method further includes comparing each voice signal frame with a corresponding reference phrase frame of the same time interval. Once all of the corresponding frames have been compared, the matching percentage between the voice signal frames and the reference phrase frames is determined. Still further, the preferred comparison method includes comparing the matching percentage to a predetermined threshold to determine if the reference phrase is actually present in the voice signal.

Correspondingly, a system of testing voice signals in a telecommunication system is provided. The system includes a processor for controlling the generation of a test signal to elicit a response from the telecommunication network. The system further includes a telecommunication interface in communication with the processor and the telecommunication system to generate the test signal and to detect a voice signal produced by the telecommunication system in response to the test signal. A database in communication with the processor stores the detected voice signal and a plurality of reference phrases, wherein one or more designated reference phrases can be combined to form an expected voice signal. Voice recognition software operable with the processor then compares the detected voice signal with the designated reference phrases to determine if the detected voice signal substantially corresponds to the expected voice signal.

The above objects and other objects, features, and advantages of the present invention are more readily understood from a review of the attached drawings and the accompanying specification and claims.

BEST MODE FOR CARRYING OUT THE INVENTION

The present invention provides a system and method for evaluating the operation, accuracy, and quality of a telecommunication system, specifically the voice signals generated by the system. The voice signals are typically provided as part of a voice messaging system (VMS) in the form of voice prompts to a caller. The testing system is operable to record voice prompts played by the VMS and to compare the voice prompts to reference prompts to ensure that the VMS is functioning properly. In the system and method of the present invention, the reference prompts are not stored as entire sentences, but rather stored as a lesser number of discrete phrases which can be combined to form a multitude of different complete prompt sentences. These stored reference phrases are compared with the voice prompts recorded from the VMS in a phrase-by-phrase manner. Therefore, using the present invention, less information needs to be stored, less time is required to perform voice recognition, and greater flexibility is offered while providing accurate voice recognition.

Figure 1:
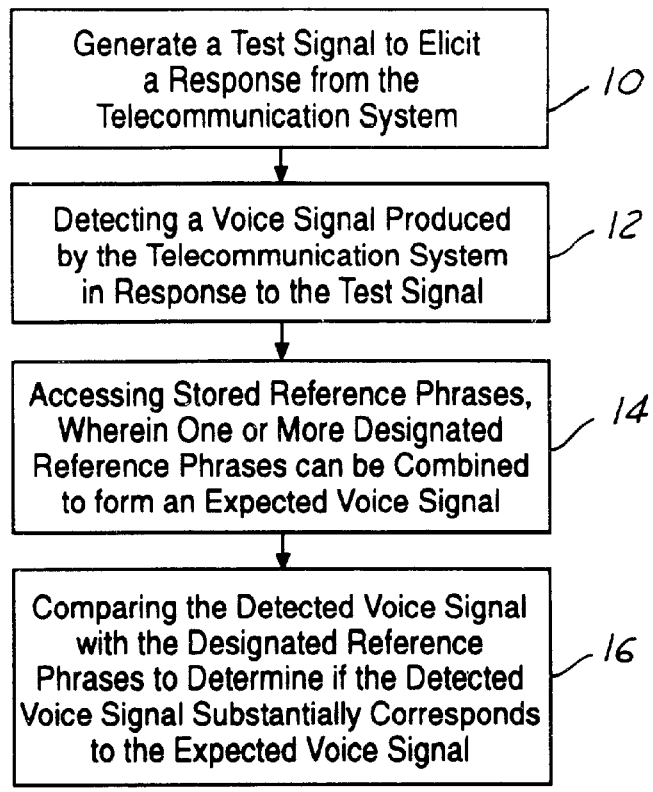
FIG. 1 is a block diagram outlining the method of testing voice signals of the present invention.

FIG. 1 shows a block diagram of the testing method of the present invention. Referring to block 10, the method includes generating a test signal to elicit a response from the telecommunication system. The method further includes detecting a voice signal produced by the telecommunication system in response to the test signal, as shown in block 12. Still further, as shown in block 14, the method includes accessing stored reference phrases, wherein one or more designated reference phrases can be combined to form an expected voice signal. Then, as shown in block 16, the method includes comparing the detected voice signal with the designated reference phrases to determine if the detected voice signal substantially corresponds to the expected voice signal.

Figure 2:
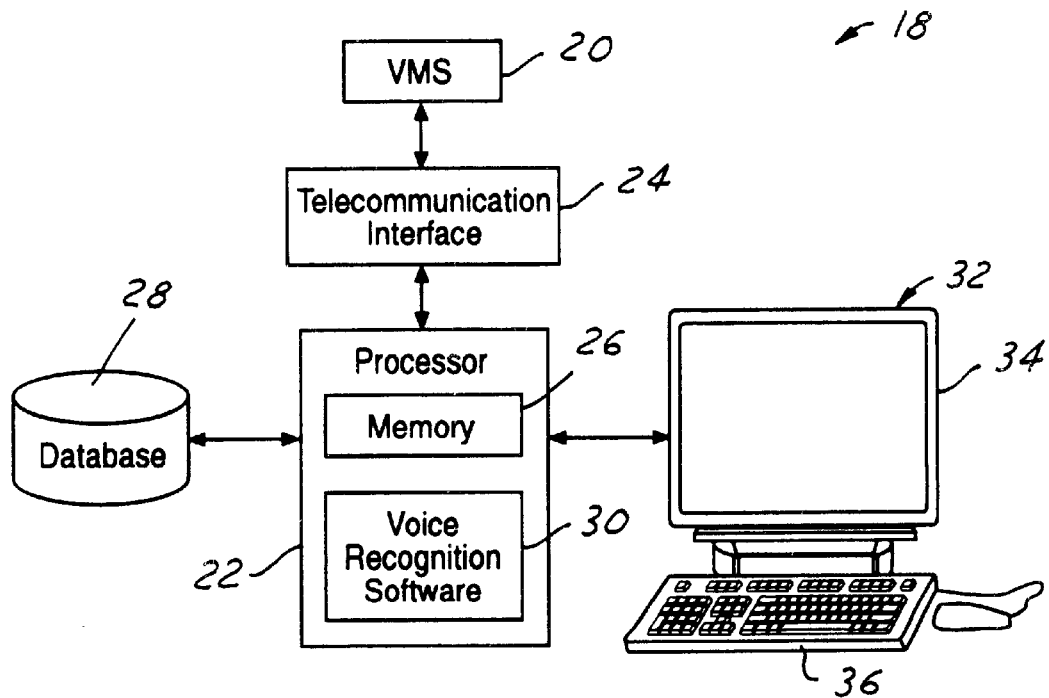
FIG. 2 is a schematic representation of the voice testing system of the present invention.

The testing system of the present invention, designated generally by reference numeral 18, is shown in FIG. 2. Testing system 18 interacts with a telecommunication system, such as a VMS 20, to test its operation. Testing system 18 includes a processor 22 that controls the execution of test scripts, which are files defining testing parameters for interacting with VMS 20 and sequences of actions to be performed. For example, the test scripts can include commands to dial a telephone number to establish communication with VMS 20, communicate information to VMS 20, detect and store information from VMS 20, as well as verify the information received. Test scripts can include commands for generating test signals in the form of both voice signals and DTMF signals in order to simulate transactions that typically take place on VMS 20.

As shown in FIG. 2, processor 22 communicates with VMS 22 via a telecommunication interface 24, preferably a telephony interface circuit board (TICB). An example of a suitable TICB is Model No. D41ESC manufactured by Dialogic Corp. (Parsipanny, N.J.). Telecommunication interface 24 is capable of generating voice signals and non-voice signals, such as DTMF signals, to elicit responses from VMS 20. Telecommunication interface 24 is also capable of receiving and recording voice signals from VMS 20. Voice and non-voice signals can be generated interactively to test VMS 20 in real time, or preferably by executing preexisting test scripts.

Still referring to FIG. 2, telecommunication interface 24 can be connected directly to a local user switch (not shown) or VMS 20 by any connection supported by the switch or VMS 20. Alternatively, telecommunication interface 24 can be connected to VMS 20 via a switched telephone network (not shown) by an analog line, digital line, or other suitable connection. Although a connection to only one VMS 20 is shown in FIG. 2, testing system 18 preferably includes multiple channels for connecting to multiple VMSs in parallel.

Testing system 18 compares voice prompts recorded from VMS 20 with a library of stored reference phrases. Processor 22 is in communication with at least one storage device for storing test scripts, test results, and reference phrases. The storage device may be in the form of memory 26 co-located with processor 22, or a database 28 in communication with processor 22. Reference phrases are recorded by a human being or electronic voice, preferably converted from analog to digital signals, and stored in memory 26 or database 28.

The testing system and method of the present invention eliminates the need of pre-recording reference prompts as entire sentences, since any expected voice prompt from VMS 20 can be constructed from a combination of one or more designated reference phrases. Voice recognition software 30 is operable with processor 22, and is used to determine whether the a detected voice prompt recorded from VMS 20 substantially corresponds to the voice prompt expected. Preferably, testing system 18 includes a user interface 32, such as a monitor 34 and keyboard 36, from which an operator can control the interaction with the VMS 20.

In executing a selected test script, telecommunication interface 24 is typically instructed to generate and transmit a sequence of DTMF tones representing a telephone number in order to connect with VMS 20. After establishing communication with VMS 20, testing system 18 interacts with VMS 20 by transmitting any additional DTMF tones or voice responses necessary to elicit a particular voice prompt. For example, one voice prompt that VMS 20 might play is:

"First message. End of message. Reply? Press 8."

Figure 3:
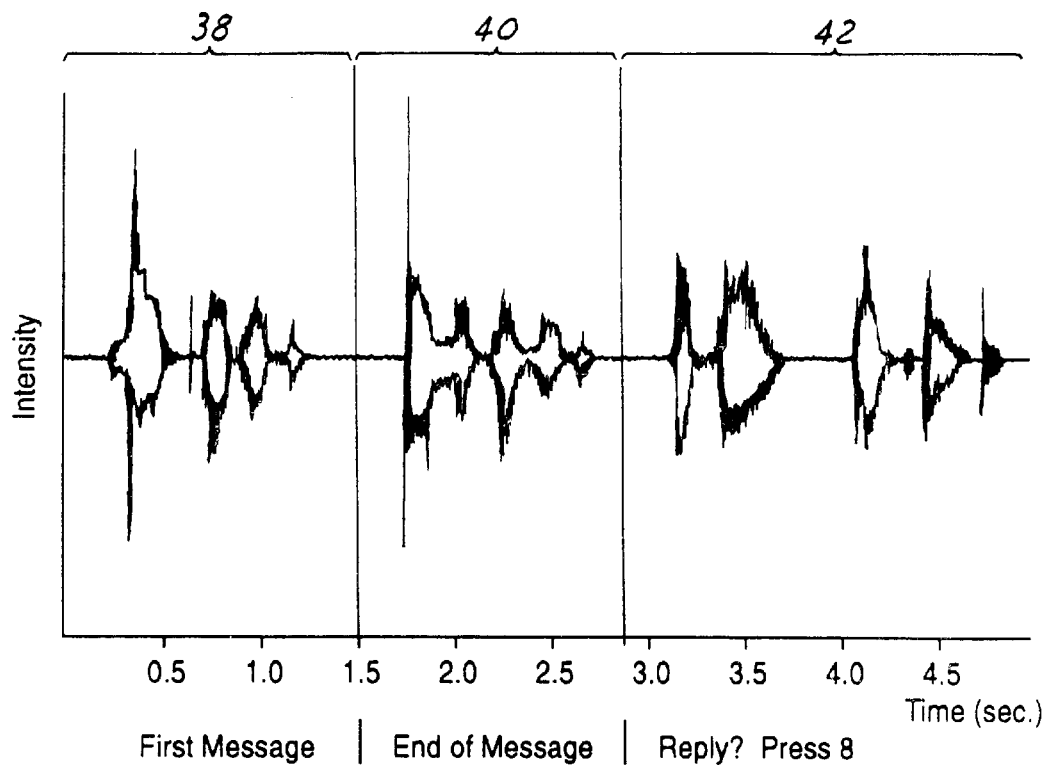
FIG. 3 shows a representative waveform from a voice prompt consisting of three segments.

The voice prompt is recorded by telecommunication interface 24 and saved in a file. An acoustic representation of the voice prompt described above is shown in FIG. 3. When viewed in the time domain, human speech generally appears as clusters of acoustic intensity, where each cluster is representative of a word or phrase. Interspersed between the clusters of acoustic intensity are gaps of relatively little or no acoustic intensity, representative of silence between words or phrases. In the voice prompt example shown in FIG. 3, the waveform consists of the three distinct voice segments, with the first segment 38 corresponding to the phrase "First message," the second segment 40 corresponding to the phrase "End of message," and the third segment 42 corresponding to the phrase "Reply? Press 8."

The test script specifies which reference phrases, preferably stored with an associated phrase number, are expected to be present in a particular voice prompt. For the example above, the test script would indicate:

VerifyPrompt(voiceprompt, 0306, 0298, 0555)

where phrase 0306 corresponds to the phrase "First message", phrase 0298 corresponds to the phrase "End of message", and phrase 0555 corresponds to the phrase "Reply? Press 8." Voice recognition software 30 will then compare the detected voice prompt with the designated reference phrases. More particularly, voice recognition software 30 will check for phrases 0306, 0298, and 0555 in the file labeled "voiceprompt" using the process described below.

Preferably, testing system 18 will attempt to match the designated reference phrases with the detected voice prompt in a particular order. Therefore, voice recognition software 30 will compare the attributes of the first reference phrase listed in the test script, in this example phrase 0306, with the detected voice prompt. Before beginning the comparison, however, voice recognition software 30 preferably trims any area of negligible acoustic intensity, corresponding to leading silence, from the beginning of the detected voice prompt. Then, the average acoustic intensity of the voice prompt as well as the first reference phrase are preferably determined. This average amplitude will be used to normalize the voice prompt and reference phrase, in order to factor out any difference in the loudness between the voice prompt and the reference phrase. In a preferred embodiment, the reference phrase is stored in normalized form as described below.

Figure 4:
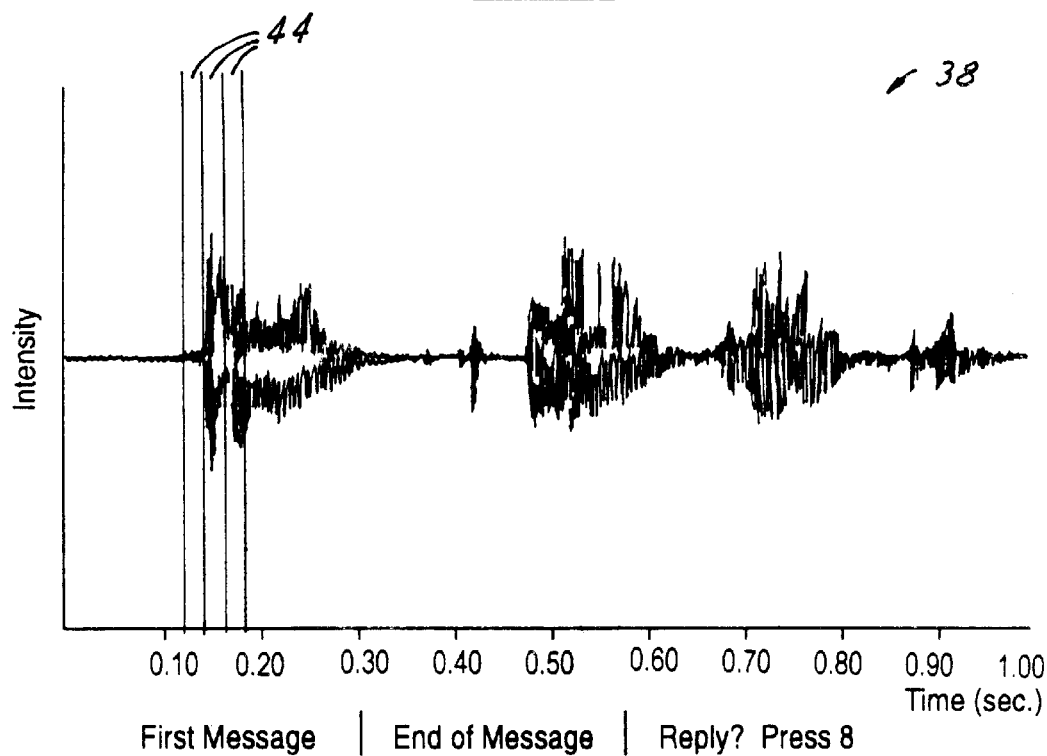
FIG. 4 is an enlarged view of the first segment of the voice prompt of FIG. 3.

Next, the voice prompt and the reference phrase are each divided into component frames 44 having substantially equal time durations. For example, first segment 38 of the voice prompt is shown in FIG. 4, where the frame duration is equal to 0.02 sec. Again, in a preferred embodiment, the reference phrases are already stored as a series of frames. For both the voice prompt and the reference phrase, voice recognition software 30 will compute two important attributes for each frame 44, namely a value of average acoustic intensity and the number of times the signal crosses the x axis, termed the zero crossings. The average acoustic intensity is a value representative of the strength of the voice signal, and the number of zero crossings is a value representative of the geometry of the signal. In the preferred embodiment where the reference phrase is stored in frames, these attributes can be predetermined as well.

Dividing by the average acoustic intensity for the entire voice prompt and reference phrase, respectively, the acoustic intensities of the frames 44 of the voice prompt and the frames of the reference phrase are normalized. Next, a reference phrase frame and a voice prompt frame 44 of corresponding time intervals are compared by evaluating the number of zero crossings and the normalized intensity of the two frames. If the frames match in terms of these two attributes, then the voice prompt frame is accepted. If not, the voice prompt frame is rejected. This process is repeated for subsequent pairs of frames along the time axis.

Once all the frames of the first reference phrase have been compared with the corresponding time frames from the voice prompt, the overall matching percentage for the voice prompt frames with the reference phrase frames is determined. If a reference phrase appears in a voice prompt, the matching percentage between the voice prompt and the reference phrase should be very high. For example, if 90% of the voice prompt frames match their corresponding reference phrase frames, it is highly probable that the reference phrase is actually present in the voice prompt. Therefore, a selected matching percentage, typically 85% to 90%, is used as a threshold value for accepting or rejecting the presence of a reference phrase in the detected voice prompt.

Figure 5:
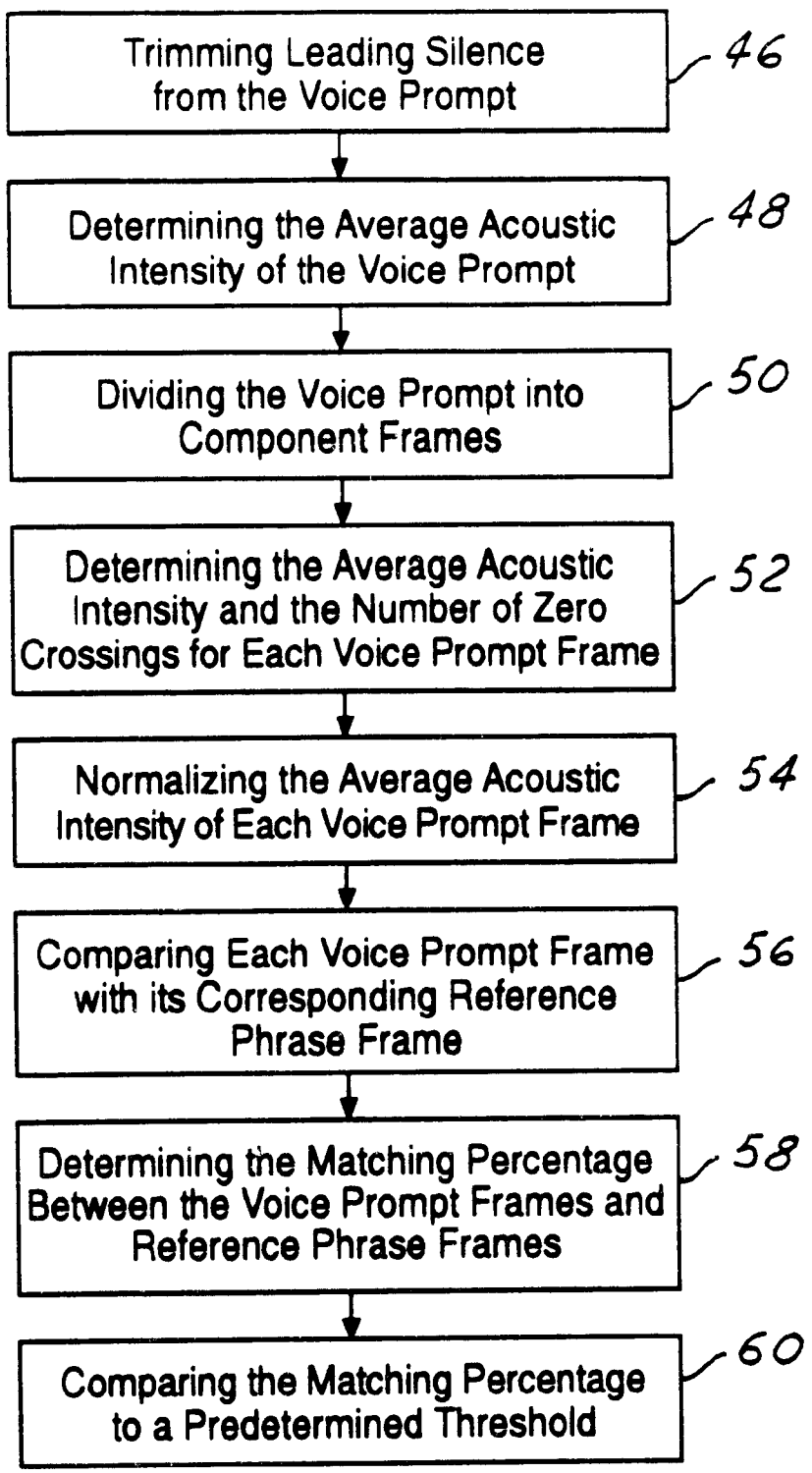
FIG. 5 is a block diagram outlining a preferred method of comparing a detected voice prompt with a reference phrase.

This preferred method of comparing the detected voice prompt with a designated reference phrase is summarized in the block diagram of FIG. 5. The method first includes trimming any leading silence from the voice prompt, as shown in block 46. Next, as shown in block 48, the average acoustic intensity of the voice prompt is determined, and then the voice prompt is divided into component frames of substantially equal time durations, as shown in block 50. Then, as shown in block 52, the average acoustic intensity and the number of zero crossings for each voice prompt frame is determined, after which the average acoustic intensity of each voice prompt frame is normalized by the average acoustic intensity of the entire voice prompt, as shown in block 54. Referring to block 56, the preferred comparison method further includes comparing each voice prompt frame with a corresponding reference phrase frame of the same time interval. Once all of the corresponding frames have been compared, the matching percentage between the voice prompt frames and the reference phrase frames is determined, as shown in block 58. Still further, as shown in block 60, the preferred comparison method includes comparing the matching percentage to a predetermined threshold to determine if the reference phrase is actually present in the voice prompt.

After determining the presence or absence of the first reference phrase, the testing system and method continue with the second and third reference phrase comparisons in a like manner. In searching for the second reference phrase in the voice prompt, a new set of frames is created in the voice prompt starting at the end point of the frames created in the search for the first reference phrase, again eliminating any periods of silence. If all three reference phrases are found, voice recognition software 30 will return a success. Otherwise, voice recognition software 30 will return a fail. If a fail condition is returned, the specific reference phrase or phrases missing from the voice prompt will be identified in order to expedite troubleshooting of VMS 20. Using the testing system and method of the present invention to compare phrases rather than entire sentences, the simplicity, speed, and reliability of the voice comparison process are all greatly improved.

While embodiments of the invention have been illustrated and described, it is not intended that these embodiments illustrate and describe all possible forms of the invention. Rather, the words used are words of description rather than limitation, and it is understood that various changes may be made without departing from the spirit and scope of the invention.

What is claimed is:

1. A method for testing voice signals in a telecommunication system, the method comprising:
   generating a test signal to elicit a response from the telecommunication system;
   detecting a voice signal produced by the telecommunication system in response to the test signal;
   accessing stored reference phrases, wherein designated reference phrases being combined to form and expected voice signal; and
   comparing the detected voice signal with said expected voice signal determine if the detected voice signal corresponds to the expected voice signal.

2. The method of claim 1, wherein generating a test signal includes generating a DTMF signal.

3. The method of claim 1, wherein generating a test signal includes generating a voice signal.

4. The method of claim 1, wherein detecting a voice signal includes detecting a voice signal produced by a voice messaging system (VMS).

5. The method of claim 1, further comprising dividing the voice signal and the at least one reference phrase into component frames of substantially equal time durations.

6. The method of claim 5, further comprising determining an average acoustic intensity of each voice signal frame and of each reference phrase frame.

7. The method of claim 6, further comprising
   determining an average acoustic intensity of the voice signal and normalizing the average acoustic intensity of each voice signal frame by the average acoustic intensity of the entire voice signal; and
   determining an average acoustic intensity of the reference phrase and normalizing the average acoustic intensity of each reference phrase frame by the average acoustic intensity of the entire reference phrase.

8. The method of claim 5, further comprising determining the number of zero crossings in each voice signal frame and in each reference phrase frame.

9. The method of claim 5, further comprising comparing each voice signal frame with the reference phrase frame of a corresponding time interval.

10. The method of claim 5, further comprising determining a matching percentage between the voice signal frames and the reference phrase frames.

11. The method of claim 10, further comprising comparing the matching percentage with a threshold value.

12. A system for testing voice signals in a telecommunication system, the system comprising:
- a processor for controlling the generation of a test signal to elicit a response from the telecommunication network;
- a telecommunication interface in communication with the processor and the telecommunication system to generate the test signal and to detect a voice signal produced by the telecommunication system in response to the test signal;
- a storage device in communication with the processor for storing the detected voice signal and a plurality of reference phrases, wherein designated reference phrases being combined to form an expected voice signal; and
- voice recognition software operable with the processor for comparing the detected voice signal with said expected voice signal to determine if the detected voice signal substantially corresponds to the expected voice signal.

13. The system of claim 12, wherein the telecommunication system includes a voice messaging system (VMS).

14. The system of claim 12, wherein the test signal comprises a DTMF signal.

15. The system of claim 12, wherein the test signal comprises a voice signal.

16. The system of claim 12, wherein the detected voice recognition software is operable to divide the voice signal and at least one reference phrase into component frames of equal time durations.

17. The system of claim 16, wherein the voice recognition software is operable to determine an average acoustic intensity of each voice signal frame and of each reference phrase frame.

18. The system of claim 17, wherein the voice recognition software is operable to determine an average acoustic intensity of the voice signal and normalize the average acoustic intensity of each voice signal frame by the average acoustic intensity of the entire voice signal, and to determine an average acoustic intensity of the reference phrase and normalize the average acoustic intensity of each reference phrase frame by the average acoustic intensity of the entire reference phrase.

19. The system of claim 16, wherein the voice recognition software is operable to determine the number of zero crossings in each voice signal frame and in each reference phrase frame.

20. The system of claim 16, wherein the voice recognition software is operable to compare each voice signal frame with the reference phrase frame of a corresponding time interval.

21. The system of claim 16, wherein the voice recognition software is operable to determine a matching percentage between the voice signal frames and the reference phrase frames.

22. The system of claim 21, wherein the voice recognition software is operable to compare the matching percentage with a threshold value.

* * * * *